Sept. 1, 1931.    G. W. WILLIAMS    1,821,489
LIQUID COOLER
Filed Jan. 29, 1931
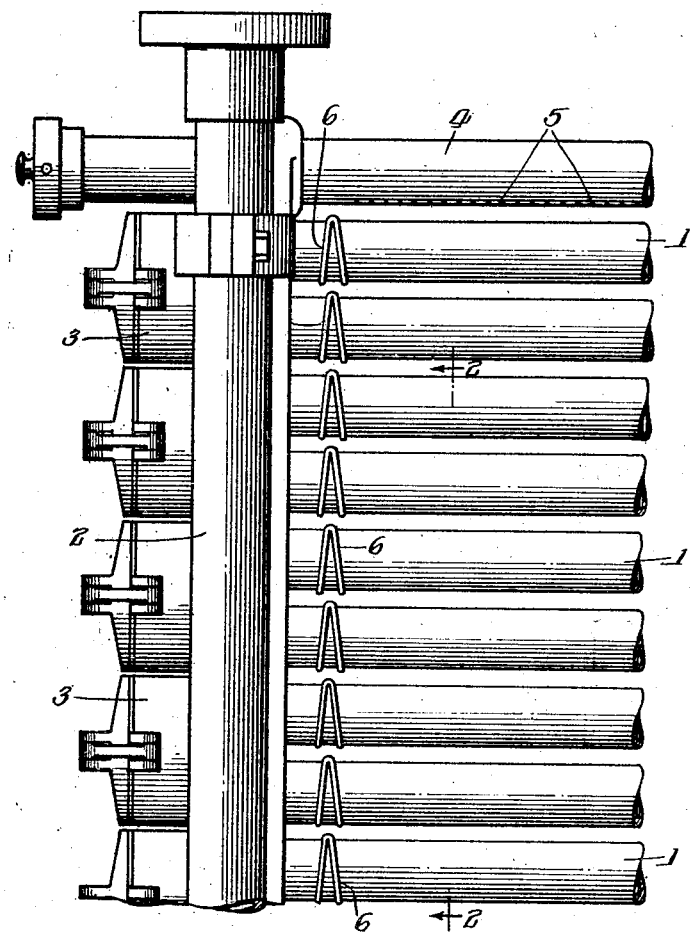
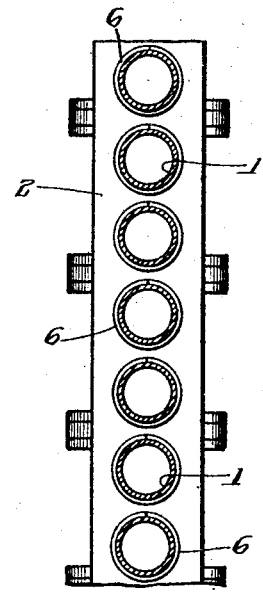
Inventor:
George W. Williams,
By Hewitt & Dixon atty.

Patented Sept. 1, 1931

1,821,489

REISSUED

UNITED STATES PATENT OFFICE

GEORGE W. WILLIAMS, OF OAK PARK, ILLINOIS, ASSIGNOR TO THE CREAMERY PACKAGE MFG. COMPANY, OF CHICAGO, ILLINOIS, A CORPORATION OF ILLINOIS

LIQUID COOLER

Application filed January 29, 1931. Serial No. 512,013.

The invention relates to liquid coolers, and more particularly to the type in which a series of vertically arranged horizontal tubes contain a cooling medium while the liquid being cooled flows by gravity over their outer surfaces.

In coolers of this type it has been found that condensation of moisture from the atmosphere forms upon the extreme ends of the tubes where the liquid being cooled normally does not flow, and also upon the headers or standards in which the tubes are supported, such condensation following the tubes and becoming intermingled with the liquid being cooled. In the case of milk coolers such an occurrence is obviously objectionable, and in the past it has been attempted to avoid it by affixing a single ring about each end of each tube spaced from the adjacent header, the rings being inclined from vertical so that the lower side of each ring is positioned inwardly of the upper side of the next lower ring.

The single rings divert the marginal flow of milk or other liquid inwardly away from the tube extremities and headers, but nevertheless are deficient in that the condensation forming outwardly of the rings follows the tubes to the rings, then downwardly along the outward faces of the rings to the under side, from whence the condensation drips inwardly of the next lower rings and is there intermingled with the milk.

It is the object of the present invention to provide a construction in coolers of this type which accomplishes both the inward diversion of the milk and the outward diversion of the condensation, and thus prevents any contamination of the milk by the intermingling therewith of the condensation.

Other objects and advantages will be apparent in the following detailed description of a preferred embodiment of the invention illustrated in the accompanying drawings.

In the drawings, Fig. 1 is a fractional view in elevation of a cooler showing portions of the tubes and their supports. Fig. 2 is a cross sectional view in elevation taken on the plane of the line 2—2 in Fig. 1.

Referring to the drawings, a series of horizontal tubes 1 are arranged in vertical spaced relation, and supported in a standard 2. The tubes are endwardly connected, as by return headers 3, for continuous serial flow of a heat exchange medium within the tubes. Mounted above the uppermost tube is a distribution pipe 4 from which milk, or other liquid to be cooled, is discharged through a series of openings 5 and distributed over the top tube. The milk flows by gravity down over the several succeeding lower tubes, is thereby cooled, and is collected in a pan or trough (not shown) positioned below the lowermost tube.

Mounted on the respective end portions of each tube 1, adjacent to but spaced from the standard 2, is a baffle or diverting device 6. The latter preferably comprises a pair of rings, joined at their upper edges and substantially separated at their lower edges, the joined portions of each pair of rings being positioned directly below the separated portions of the pair of rings mounted on the tube next above. The rings are affixed to the tubes by solder or other suitable means. The outer peripheries of the rings may be square or any other suitable form, and they may be constructed of one piece with the lower portion split vertically for divergent formation in two laterally inclined wings.

It will here be apparent that as the milk or other liquid under treatment flows down over the tubes, the lateral edge of the stream is diverted inwardly by the inner portion of the respective rings, and falls upon the next lower tube inside of the ring on the lower tube. Likewise, the condensation accumulated on the tube ends outwardly of the rings flows down the outer inclined portion of the respective rings and drips therefrom outwardly of the next lower ring. Thus, intermingling of milk and condensation is positively prevented.

I claim as my invention:

1. In a cooler having a series of tubes arranged in vertically spaced relation and adapted for the flow thereover of liquid, the combination therewith of flow diverting members mounted one above another about the respective tubes, said members having narrow upper edges and downwardly divergent lateral surfaces whereby liquid flowing downwardly over the surfaces of said tubes at either side of said members is prevented from passing to the other side of said members.

2. In a cooler having a series of vertically spaced tubes for the flow of liquid thereover, a split ring mounted upon each of said tubes, said ring having a joined upper portion and a divergently separated lower portion, said rings being positioned with the joined upper portion of each directly below and between the separated lower portions of the next higher ring.

3. In a cooler having a horizontally positioned tube for the flow of liquid thereover, a diverting member mounted upon and encircling said tube, said member comprising a pair of rings having their upper edges joined and their lower edges substantially separated.

4. In a cooler having a plurality of vertically spaced horizontal tubes, a plurality of rings encircling said tubes respectively and arranged in vertical serial relation, said rings having unitary upper portions and divided spaced lower portions whereby the lateral surfaces of the divided lower portions laterally overextend the unitary upper portions of the next lower rings.

In witness whereof I have hereunto attached my signature.

GEORGE W. WILLIAMS.